(12) United States Patent
Nabei et al.

(10) Patent No.: US 11,118,690 B2
(45) Date of Patent: Sep. 14, 2021

(54) FLUID CONTROL VALVE AND FLUID CONTROL VALVE MANUFACTURING METHOD

(71) Applicant: CKD CORPORATION, Komaki (JP)

(72) Inventors: Tatsushi Nabei, Kasugai (JP); Michio Miyashita, Seto (JP); Shinji Ishikawa, Kasugai (JP); Fumihito Tsuchiya, Komaki (JP)

(73) Assignee: CKD CORPORATION, Komaki (JP)

( * ) Notice: Subject to any disclaimer, the term of this patent is extended or adjusted under 35 U.S.C. 154(b) by 304 days.

(21) Appl. No.: 16/309,051

(22) PCT Filed: Jun. 19, 2017

(86) PCT No.: PCT/JP2017/022497
§ 371 (c)(1),
(2) Date: Dec. 11, 2018

(87) PCT Pub. No.: WO2017/221877
PCT Pub. Date: Dec. 28, 2017

(65) Prior Publication Data
US 2019/0257432 A1    Aug. 22, 2019

(30) Foreign Application Priority Data
Jun. 21, 2016   (JP) .............................. JP2016-123047

(51) Int. Cl.
*F16K 1/36* (2006.01)
*F16K 31/122* (2006.01)
*F16K 41/12* (2006.01)

(52) U.S. Cl.
CPC .............. *F16K 1/36* (2013.01); *F16K 31/122* (2013.01); *F16K 31/1221* (2013.01); *F16K 41/12* (2013.01)

(58) Field of Classification Search
CPC ... F16K 1/36; F16K 1/48; F16K 1/482; F16K 1/485; F16K 1/487; F16K 1/50; F16K 31/122; F16K 31/1221; F16K 41/12
(Continued)

(56) References Cited

U.S. PATENT DOCUMENTS 3,794,092 A  *  2/1974  Carlson ................... F16B 39/30
411/310
4,872,638 A  *  10/1989  Thompson .......... F16K 31/1262
251/54

(Continued)

FOREIGN PATENT DOCUMENTS

CN      102160012 A    8/2011
CN      202193286 U    4/2012
(Continued)

OTHER PUBLICATIONS

Aug. 18, 2020 Office Action issued in Japanese Patent Application No. 2018-524073.
(Continued)

*Primary Examiner* — Kevin F Murphy
*Assistant Examiner* — Jonathan J Waddy
(74) *Attorney, Agent, or Firm* — Oliff PLC

(57) ABSTRACT

A fluid control valve and manufacturing method thereof, wherein, when a pressing force acts on the engagement surface between a diaphragm member and a valve seat-contacting member, the valve seat-contacting member is not displaced and no gap is formed. The diaphragm member made of a first fluorine-based resin material is provided with a diaphragm membrane and a rod-shaped part in the center of the diaphragm membrane. The valve seat-contacting member made of an injection-moldable second fluorine-based resin material is provided with a ring-shaped sealing surface and a recess on the opposite side from the ring-
(Continued)

shaped sealing surface. The rod-shaped part is partly fitted into the recess. A ring-shaped recessed is formed on outer circumference of a portion of the rod-shaped part. A small diameter recess is formed on the inner circumference of the recess. The ring-shaped recess section and the small diameter recess adhere closely to form the engagement surface.

6 Claims, 8 Drawing Sheets

(58) Field of Classification Search
USPC .................................. 264/250, 273, 274, 275
See application file for complete search history.

(56) References Cited

U.S. PATENT DOCUMENTS

| | | | | |
|---|---|---|---|---|
| 5,910,278 | A * | 6/1999 | Enomoto | F16J 3/041 |
| | | | | 264/138 |
| 7,628,376 | B2 * | 12/2009 | Masamura | F16K 7/14 |
| | | | | 251/331 |
| 10,167,960 | B2 | 1/2019 | Shikawa et al. | |
| 2004/0104374 | A1 * | 6/2004 | Lovell | F16K 1/482 |
| | | | | 251/357 |
| 2006/0197049 | A1 * | 9/2006 | Hamada | F16K 31/1225 |
| | | | | 251/285 |
| 2008/0099081 | A1 | 5/2008 | Yamamoto | |
| 2009/0266428 | A1 * | 10/2009 | Yoshino | F16K 31/1221 |
| | | | | 137/551 |
| 2011/0041522 | A1 * | 2/2011 | Carrubba | F25B 45/00 |
| | | | | 62/77 |
| 2011/0048556 | A1 * | 3/2011 | Carter | G01D 21/00 |
| | | | | 137/559 |
| 2011/0175009 | A1 | 7/2011 | Kristoffersen | |
| 2014/0360599 | A1 | 12/2014 | Kristoffersen | |
| 2016/0169396 | A1 * | 6/2016 | Ishikawa | F16K 41/103 |
| | | | | 251/213 |

FOREIGN PATENT DOCUMENTS

| | | |
|---|---|---|
| JP | S63-022470 U | 2/1988 |
| JP | H06-340399 A | 12/1994 |
| JP | 2006-070946 A | 3/2006 |
| JP | 2011-122718 A | 6/2011 |
| JP | 2016-084891 A | 5/2016 |
| JP | 2016-114240 A | 6/2016 |

OTHER PUBLICATIONS

Jul. 3, 2020 Office Action issued in Chinese Patent Application No. 201780037633.1.
Sep. 5, 2017 International Search Report issued in Inetemational Patent Application No. PCT/JP2017/022497.
Dec. 28, 2018 International Preliminary Reporton Patentability issued in International Patent Application No. PCT/JP2017/022497.
Oct. 18, 2019 Office Action issued in Chinese Patent Application No. 201780037633.1.
Zhimian, Qian. "Handbook of Applications of Plastics Properties Revised version". Shanghai Science and Technology Literature Publishing House, pp. 317-318, Mar. 31, 1987.
Apr. 16, 2021 Office Action issued in Korean Patent Application No. 10-2018-7036508.

* cited by examiner (a)

(b)

(a)

(b)

FLUID CONTROL VALVE AND FLUID CONTROL VALVE MANUFACTURING METHOD

CROSS-REFERENCE TO RELATED APPLICATIONS

This is a US national phase application based on the PCT International Patent Application No. PCT/JP2017/022497 filed on Jun. 19, 2017, and claiming the priority of Japanese Patent Application No. 2016-123047 filed on Jun. 21, 2016, the entire contents of which are herewith incorporated by reference.

TECHNICAL FIELD

The present disclosure relates to a fluid control valve to control a fluid and a fluid control valve manufacturing method.

BACKGROUND ART

The present applicant has proposed in Patent Literature 1 a fluid control valve and a fluid control method for preventing a valve from abrasion caused by deformation of a valve element during valve closing and for reducing generation of particles. In the technique of the Patent Literature 1, a diaphragm member made of PTFE is formed and inserted in a metal die as shown in FIG. 31, for example. A valve-seat contact member configured to be in and out of contact with a valve seat made of PFA is formed in an outer circumference of the diaphragm member to constitute a valve element.

RELATED ART DOCUMENTS

Patent Documents

Patent Document 1: JP 2016-114240 A1

SUMMARY OF INVENTION

Problems to be Solved by the Invention

When an outer circumference of a bar-like portion, which is arranged in a center of a web portion of the diaphragm member, is fitted in a recessed portion of the valve-seat contact member, a connected part is prone to have only a small bonding strength in a case of forming these fluorine-resin elements by insert molding.

Herein, connected surfaces between the outer circumferential uneven surface of the bar-like portion and the inner circumferential uneven surface of the recessed portion are in parallel with a horizontal plane in a radial direction and also the connected surfaces between the outer circumferential uneven surface of the bar-like portion and the inner circumferential uneven surface of the recessed portion are slanted more toward the outer circumference as approaching the web portion. In this case, the small boding strength could result in displacement of the recessed portion that is subjected to a force on an outer circumferential side due to a pressing force applied to the connected part of an outer circumferential uneven surface and an inner circumferential uneven surface. This pressing force is applied when a valve element is driven by a drive section to repeatedly bring the valve-seat contact member into contact with the valve seat for a long time.

When a clearance is generated between the bar-like portion and the recessed portion due to displacement of the recessed portion, a chemical liquid could reside in the clearance and the thus resided chemical liquid may get degraded to cause particles.

The present disclosure has been made to solve the above problem and has an object to provide a fluid control valve and a fluid control valve manufacturing method causing no displacement in a valve-seat contact member and generating no clearance when an engagement surface between a diaphragm member made of a first fluorine resin material and the valve-seat contact member made of a second fluorine resin material is subjected to a pressing force.

Means of Solving the Problems

A fluid control valve and a fluid control valve manufacturing method of the present disclosure have the following configuration.

(1) A fluid control valve comprises: a valve main body provided with a valve seat; a valve element provided with a valve-seat contact member to be in and out of contact with the valve seat and a diaphragm member; and a drive section configured to move the valve element in its axial direction, wherein the diaphragm member made of a first fluorine resin material is provided with a web portion and a bar-like portion formed in a center of the web portion, the valve-seat contact member made of a second fluorine resin material, which is allowed to be insert-molded, is provided with a valve-seat contact surface and a recessed portion on a side opposite to the valve-seat contact surface, a part of the bar-like portion is fitted in the recessed portion, and the part of the bar-like portion is formed on its outer circumference with an outer circumferential uneven surface, the recessed portion is formed on its inner circumference with an inner circumferential uneven surface, and the outer circumferential uneven surface and the inner circumferential uneven surface are in close contact with each other to form an engagement surface.

(2) In the fluid control valve described in the above (1), the engagement surface partly has a slanting surface slanted away from the web portion as approaching the outer circumference. The slanting surface may be any one of a flat surface and a curved surface.

(3) In the fluid control valve described in the above (1) or (2), the engagement surface is slanted by a degree range of 5 degrees or more and 15 degrees or less with respect to a horizontal plane in a radial direction.

(4) In the fluid control valve described in any one of the above (1) to (3), the recessed portion extends over an annular recess formed on the outer circumferential uneven surface of the bar-like portion toward the web portion.

(5) In the fluid control valve described in any one of the above (1) to (4), the bar-like portion and the recessed portion are provided with a rotation restriction part.

(6) In the fluid control valve described in any one of the above (1) to (5), the first fluorine resin material is PTFE and the second fluorine resin material is PFA.

(7) In the fluid control valve described in any one of the above (1) to (6), the drive section is provided with a contact spring configured to urge the valve element in a direction to be in contact with the valve seat and a piston configured to urge the valve element in a direction to separate the valve element from the valve seat by an operation fluid, and the valve element is provided with a separation spring to urge the valve element in the direction to separate the valve element and the separation spring is configured to expand by changing its spring constant in a process of moving the valve element in the direction to be in contact.

(8) In the fluid control valve described in any one of the above (1) to (7), a male thread member provided with an orifice in an axial center is placed in a lower chamber port of the piston.

(9) A fluid control valve manufacturing method of manufacturing a fluid control valve comprises a valve main body provided with a valve seat, a valve element provided with a valve-seat contact member configured to be in and out of contact with the valve seat and a diaphragm member, and a drive section configured to move the valve element in its axial direction, wherein the diaphragm member made of a first fluorine resin material is provided with a web portion and a bar-like portion in a center of the web portion, the valve-seat contact member made of a second fluorine resin material, which is allowed to be insert-molded, is provided with a valve-seat contact surface and a recessed portion on a side opposite to the valve-seat contact surface, a part of the bar-like portion is fitted in the recessed portion, the part of the bar-like portion is formed on its outer circumference with an outer circumferential uneven surface and the recessed portion is formed on its inner circumference with an inner circumferential uneven surface, and the method includes an insert molding step of inserting a first round bar and injection-molding a second round bar and a step of cutting the first round bar into a shape of the diaphragm member and cutting the second round bar into a shape of the valve-seat contact member.

According to the above-mentioned configuration, the fluid control valve and the fluid control valve manufacturing method of the present disclosure have the following operations and effects.

In the disclosure of (1), the part of the bar-like portion is fitted in the recessed portion, the part of the bar-like portion is formed on its outer circumference with the outer circumferential uneven surface, the recessed portion is formed on its inner circumference with the inner circumferential uneven surface, and the outer circumferential uneven surface and the inner circumferential uneven surface are in close contact with each other to form the engagement surface. Accordingly, there is no clearance created between the recessed portion and the bar-like portion even after a long-time use, resulting in no residual of chemical liquid and generating no particles due to degradation of the residual chemical liquid.

In the disclosure of (2), the engagement surface is partly provided with the slanting surface slanted away from the web portion as approaching the outer circumference. Accordingly, when the valve element is driven by the drive section to repeatedly bring the valve-seat contact member into contact with the valve seat for a long period of time, the slanting surface formed to be slanted away from the web portion as approaching the outer circumference restrains displacement of the recessed portion to outside even when the connected part between the outer circumferential uneven surface and the inner circumferential uneven surface are subjected to the pressing force. Therefore, no clearance is generated between the recessed portion and the bar-like portion.

In the disclosure of (3), the engagement surface is slanted in a degree range of 5 degrees or more and 15 degrees or less with respect to the horizontal plane in the radial direction. In a case that the engagement surface of the outer circumferential uneven surface and the inner circumferential uneven surface is on the same plane with the horizontal plane in the radial direction, the outer circumferential uneven surface and the inner circumferential uneven surface are subjected to a force in a direction to create a clearance when the valve element is driven to bring the valve-seat contact member into contact with the valve seat. This could chronologically increase the clearance. When the engagement surface is slanted by 5 degrees or more with respect to the horizontal plane in the radial direction, the outer circumferential uneven surface inwardly presses the inner circumferential uneven surface, applying the force in a direction to close the clearance. Accordingly, there is no possibility of chronological increase in the clearance. On the other hand, when the slanting angle exceeds 15 degrees, the outer circumferential uneven surface could be expanded to cause abrasion and generate particles.

Each of the annular recess formed on the outer circumferential uneven surface and the inner circumferential uneven surface is slanted by 5 to 15 degrees with respect to a plane surface horizontal to a radial direction about an axis of the bar-like portion. Accordingly, when the valve element is in contact with the valve seat, an upper end face of the inner circumferential uneven surface is subjected to a downward pressing force. Owing to an operation of the slanting surface, however, an upper part of the inner circumferential uneven surface is subjected to an inward force, so that the upper part of the inner circumferential uneven surface has no possibility of disengagement from the outer circumferential uneven surface. When the slanting angle is less than 5 degrees, the upper part of the inner circumferential uneven surface may be disengaged from the annular recess formed on the outer circumferential surface. When the slanting angle exceeds 15 degrees, the annular recess formed on the outer circumferential surface is expanded to cause abrasion and generate particles.

In the disclosure of (4), the recessed portion radially extends over the outer circumferential uneven surface of the bar-like portion to the diaphragm web side. When the valve element is driven to bring the valve-seat contact member into contact with the valve seat, a relationship of the outer circumferential uneven surface with the inner circumferential uneven surface is defined as expanding or being expanded by the inner circumferential uneven surface. The recessed portion is however formed to extend over the outer circumferential uneven surface of the bar-like portion to the diaphragm web side, and this extended portion of the recessed portion restricts the outer circumferential uneven surface from expanding or being expanded, so that increase in the clearance is restrained and occurrence of abrasion is prevented.

In the disclosure of (5), the bar-like portion and the recessed portion are formed with the rotation restriction part. Accordingly, the bar-like portion and the recessed portion are prevented from rotating each other in a circumferential direction, resulting in no possibility of clearance between the bar-like portion and the recessed portion.

In the disclosure of (6), the first fluorine resin material is PTFE and the second fluorine resin material is PFA. Accordingly, a combination of a diaphragm member having softness and high flexibility and a valve-seat contact member having hardness and high abrasion resistance achieves improvement in endurability. Further, generation of particles can be restrained.

In the disclosure of (7), the drive section is provided with the contact spring to urge the valve element into contact with the valve seat and the piston to urge the valve element to separate from the valve seat by the operation fluid, and further provided with the separation spring to urge the valve element to separate from the valve seat. The separation spring is configured to increase its spring constant in the process of moving the valve element to be in contact, and thus a collisional force generated during valve closing can be relaxed with maintaining the responsivity of the valve element. Accordingly, a clearance between the bar-like portion and the recessed portion, which could be generated by the collisional force, can be restrained.

In the disclosure of (8), the male thread member provided with the orifice in its axial center is placed in the lower chamber port of the piston. Accordingly, the collisional force generated during valve closing is relaxed with maintaining the responsivity of the valve element. Accordingly, the clearance between the bar-like portion and the recessed portion, which could be generated by the collisional force, can be restrained.

In the disclosure of the fluid control valve manufacturing method of (9), a part of the bar-like portion is fitted in the recessed portion, a part of the outer circumference of the bar-like portion is formed with the outer circumferential uneven surface, the inner circumference of the recessed portion is formed with the inner circumferential uneven surface. The method includes an insert molding step of injection-molding the second round bar to cover a part of the inserted first round bar, and a step of cutting the first round bar into a shape of the diaphragm member and the second round bar into a shape of the valve-seat contact member after the insert-molding step. Therefore, no clearance is generated between the recessed portion and the bar-like portion, resulting in no residual in chemical liquid and generating no particles due to degradation of the residual chemical liquid.

As mentioned above, even if the diaphragm valve element, which is formed by inserting the PTFE-made diaphragm member into the PFA-made valve-seat contact member, is repeatedly driven to open and close, no clearance is generated between the bar-like portion and the recessed portion.

MODE FOR CARRYING OUT THE INVENTION

A detailed description of preferred embodiments of a fluid control valve and a fluid control valve manufacturing method embodying the present disclosure is now given referring to the accompanying drawings.
(Schematic Configuration of Fluid Control Valve)

Figure 1:
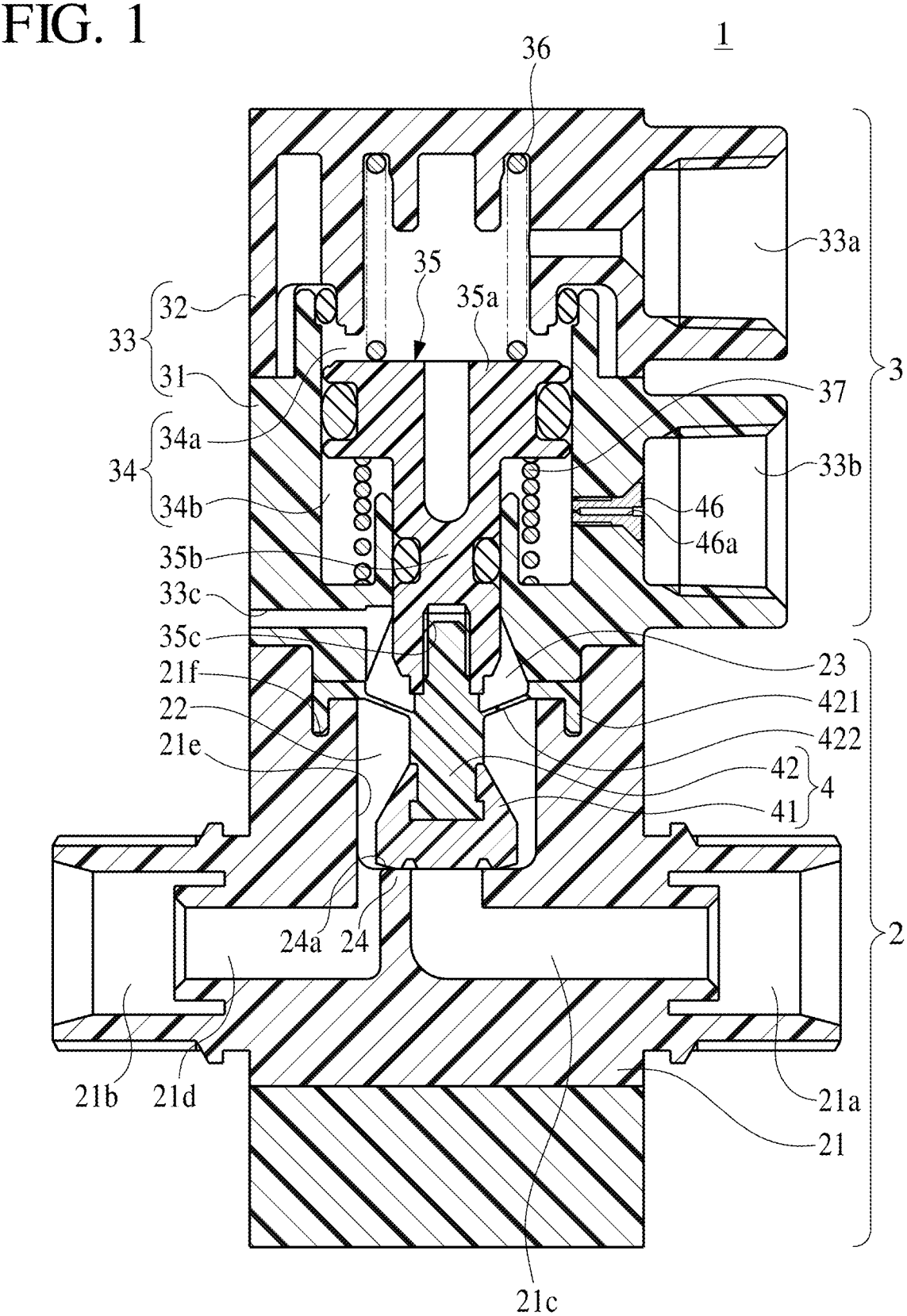
FIG. 1 is a sectional view showing a structure of a fluid control valve in the present embodiment.

FIG. 1 is a sectional view of a fluid control valve 1 in a closed state according to the present embodiment.

As shown in FIG. 1, the fluid control valve 1 includes a valve section 2 to control a fluid and a drive section 3 to apply a driving force to the valve section 2. The fluid control valve 1 is, for example, mounted in a semiconductor manufacturing device to regulate a flow rate of a chemical liquid which will be supplied to a wafer. Since the fluid control valve 1 sometimes controls a chemical liquid having high corrosivity, the drive section 3 and the valve section 2 are partitioned by a diaphragm valve element 4.

The drive section 3 includes a cylinder 33 constituted of a cylinder body 31 and a cylinder cover 32. A piston 35 includes a piston body 35a slidably provided in a piston chamber 34 which is formed in the cylinder 33. The piston body 35a hermetically divides the piston chamber 34 into a first chamber 34a and a second chamber 34b. The piston body 35a is integrally formed with a shaft 35b. A lower end part of the shaft 35b protrudes from the cylinder 33 to the valve section 2 and is coupled with the diaphragm valve element 4 in the valve section 2.

A first compression spring 36 (one example of a contact spring), which will apply a sealing load to the diaphragm valve element 4, is provided in the first chamber 34a in a contraction manner to continuously urge the piston 35 toward a valve seat 24 in the valve section 2. With a lower surface of the piston body 35a, one end of a second compression spring 37 (one example of a separation spring) is in contact. The other end of the second compression spring 37 is in contact with an inner circumferential upper surface of the cylinder body 31. In FIG. 1, the second compression spring 37 is in a compressed state.

Figure 7:
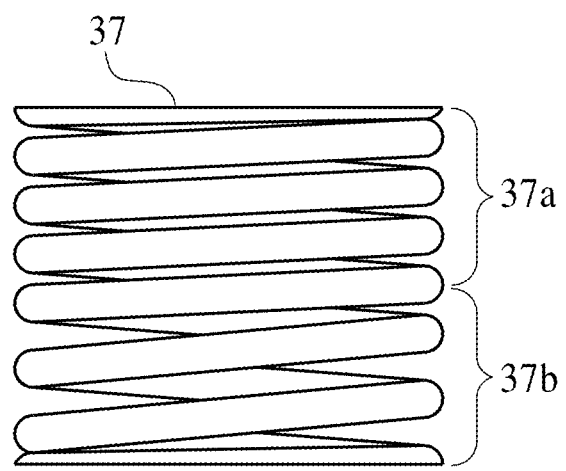
FIG. 7 is a view of a second compression spring at an equilibrium length with no load subjected.
Figure 8:
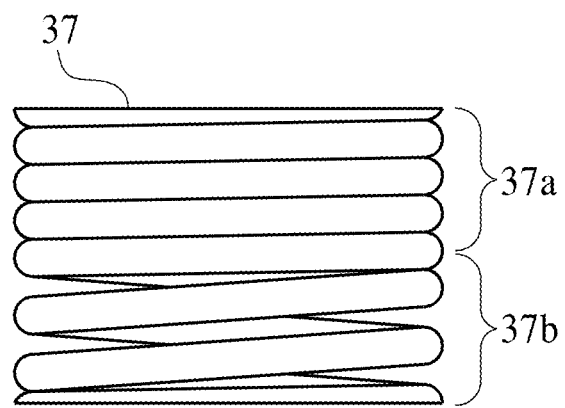
FIG. 8 is a view of the second compression spring in a compressed state as shown in FIG. 1.

The second compression spring 37 is shown in FIG. 7. In FIG. 7, the second compression spring 37 is at an equilibrium length with no load subjected. FIG. 8 shows the second compression spring 37 in a compressed state in FIG. 1. The second compression spring 37 includes a first coil part 37a having a narrow coil clearance and a second coil part 37b having a wide coil clearance.

In a state shown in FIGS. 1 and 8, respective coil pieces of the first coil part 37a are closely contacted one another, having no function as a spring. Only the second coil part 37b functions as a spring. Accordingly, the coil functioning as a spring is short in a state in FIGS. 1 and 8, and thus the second compression spring 37 apparently has a large spring constant. This second compression spring 37 strongly acts in a direction to bring an annular sealing surface 414 away from a valve seat surface 24a when the annular sealing surface 414 is about to be in contact with the valve seat surface 24a. This action of the second compression spring 37 achieves relaxation of a collisional force generated in valve closing while the responsivity of the diaphragm valve element 4 is maintained, thus preventing generation of a clearance between the bar-like portion and the recessed portion that is possibly created by the collisional force.

The cylinder 33 is formed with an intake and exhaust port 33a communicated with the first chamber 34a to intake and exhaust air, and an operation port 33b communicated with the second chamber 34b to supply operation air.

The drive section 3 drives the piston 35 to make a linear reciprocating motion in an axial direction by the balance of the spring force of the first compression spring 36 and the second compression spring 37 with the inner pressure of the second chamber 34b to move the diaphragm valve element 4 by a predetermined stroke. Constituent elements of the drive section 3 except the first compression spring 36 and the second compression spring 37 are made of fluororesin so that the drive section 3 can be used in highly corrosive atmosphere.

A threaded orifice 46 is placed between the second chamber 34b and the operation port 33b. The threaded orifice 46 includes an orifice with a diameter of about 0.1 mm in its center. The orifice is constituted as a thread, and thus orifice efficiency can be easily changed only by replacing the orifice 46 with another orifice of a different diameter.

The valve section 2 mounted in a valve body 21 (one example of a valve main body) is operative to perform fluid control by bringing the annular sealing surface 414 of the diaphragm valve element 4 into or out of contact with the valve seat surface 24a of the valve seat 24. The valve body 21 and the diaphragm valve element 4 are made of fluororesin for ensuring corrosion resistance.

The valve body 21 has a rectangular parallelepiped shape formed with a first port 21a and a second port 21b individually opening at opposite sides for inflow and outflow of a fluid. An upper face of the valve body 21 is formed with a cylindrical cavity 21e opening thereon and a mounting groove 21f extending circumferentially around or outside of the cavity 21e. In the valve section 2, an outer peripheral edge 421 of the diaphragm valve element 4 is fitted in the mounting groove 21f of the valve body 21 and held between the valve body 21 and the cylinder 33, thus forming a diaphragm chamber 22 and a non-liquid-contact chamber 23. A diaphragm member 42 of the diaphragm valve element 4 is coupled with the shaft 35b to be movable inside the diaphragm chamber 22 in an upper and lower direction in the figure. The non-liquid-contact chamber 23 is communicated with a vent hole 33c formed in the cylinder 33 so that a web portion 422 is smoothly deformed in association with the motion of a valve-seat contact member 41.

A first communication passage 21c is formed in an L-shape in the valve body 21 to communicate the first port 21a with the diaphragm chamber 22 and is open in a center part of a bottom surface of the diaphragm chamber 22. On the bottom surface of the diaphragm chamber 22, the valve seat 24 is provided along an outer circumference of an opening of the first communication passage 21c. The valve seat 24 has a valve seat surface 24a formed as a flat surface orthogonally intersecting an axis of the diaphragm chamber 22. The second communication passage 21d is formed in an L-shape to communicate the second port 21b with the diaphragm chamber 22 and is open outside of the valve seat 24.

(Configuration of Valve Element)

Figure 2:
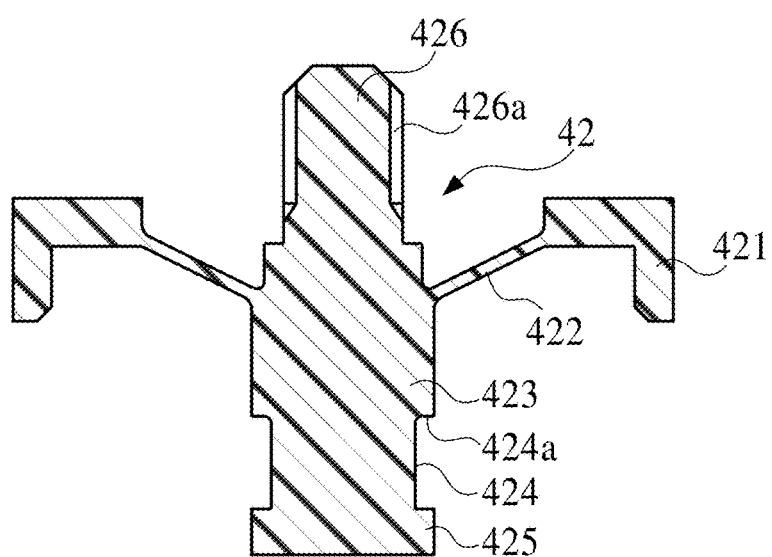
FIG. 2 is a sectional view of a diaphragm valve element in FIG. 1.
Figure 2:
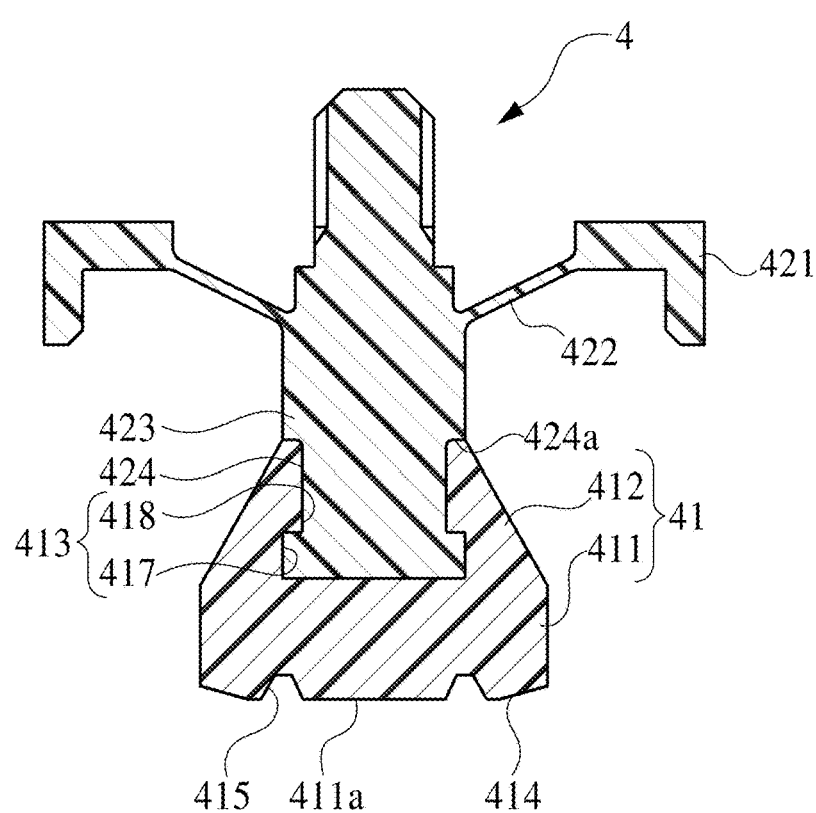

FIG. 2 is a sectional view of the diaphragm valve element 4 in FIG. 1.

The diaphragm valve element 4 includes two components of the diaphragm member 42 shown in (a) and the valve-seat contact member 41 shown in (b). The diaphragm valve element 4 is manufactured in such a manner that the diaphragm member 42 is firstly formed and inserted in a metal die, and then the valve-seat contact member 41 is injection-molded.

The diaphragm member 42 is formed by cutting a round bar made of PTFE (polytetrafluoroethylene). A cutting process is adopted because the PTFE is hard to be injection-molded and because a thickness of the web portion needs to be formed uniformly. The valve-seat contact member 41 is made of PFA (tetrafluoroethylene perfluoroalkylvinyl ether copolymer) that is easy to be injection-molded.

The valve-seat contact member 41 is preferably made of fluororesin having hardness equal to or lower than that of the valve body 21 (the valve seat 24) so that the sealing performance of the annular sealing surface 414 is enhanced. In the present embodiment, the valve body 21 (the valve seat 24) and the valve-seat contact member 41 are made of PFA with the hardness D53 to D58.

An upper part 426 of the bar-like portion 423 is coupled with the drive section 3 (see FIG. 1) to bring the valve-seat contact member 41 into or out of contact with the valve seat 24. The bar-like portion 423 is connected to the thin web portion 422 on its outer peripheral surface and an outer edge portion 421 having a thick thickness is provided on an outer edge of the web portion 422.

An annular recess 424 is formed above a lower-end outer circumferential portion 425 of the bar-like portion 423. An upper end face 424a of the annular recess 424 is a face extending vertically with respect to an axis of the bar-like portion 423.

The valve-seat contact member 41 is coaxially provided with a columnar part 411 and a shoulder part 412. The valve-seat contact member 41 is provided with a recessed portion 413 opening on its upper surface. On an upper end of the recessed portion 413, a small-diameter recess 418 protruding inwardly is formed, and below the small-diameter recess 418, a large-diameter recess 417 having a large diameter is formed.

The columnar part 411 of a columnar shape is provided with a valve-seat-side end face 411a facing the valve seat 24. The upper part 426 of the diaphragm member 42 is provided on its outer circumference with a male thread portion 426a to be threaded with a female thread portion 35c (see FIG. 1) provided in the shaft 35b.

The annular sealing surface 414 annularly protrudes about an axis of the valve-seat contact member 41 from the valve-seat-side end face 411a. The annular sealing surface 414 is formed on its inner circumference with an annular recessed groove 415. The outer circumference of the annular sealing surface 414 is shaped to have a slanting surface slanted upward.

The small-diameter recess 418 of the valve-seat contact member 41 is closely fitted in the annular recess 424 of the bar-like portion 423 of the diaphragm member 42. In the large-diameter recess 417 of the valve-seat contact member 41, the lower-end outer circumferential portion 425 of the diaphragm member 42 is closely fitted.

(General Operation of Fluid Control Valve)

When the fluid control valve 1 is in a standby state in which the chemical liquid is not supplied to a wafer, an operation fluid is not supplied to the operation port 33b. In this state, an urging force of the first compression spring 36 acts on the diaphragm valve element 4 via the piston 35 to bring the annular sealing surface 414 of the diaphragm valve element 4 into hermetically sealing with the valve seat surface 24a of the valve seat 24. At this time, the valve section 2 shuts off a passage between the first port 21a and the second port 21b in order not to supply the chemical liquid from the second port 21b to the reaction chamber.

When the chemical liquid is about to be supplied to the wafer, the fluid control valve 1 is operated to supply the operation fluid to the operation port 33b. When inner pressure in the second chamber 34b becomes larger than the urging force of the first compression spring 36, the piston 35 is moved toward an opposite side from the valve seat against the urging force of the first compression spring 36. The diaphragm valve element 4 is accordingly integrally moved upward with the piston 35 to separate the annular sealing surface 414 from the valve seat surface 24a. Thus, the fluid control valve 1 is operated to flow the chemical liquid from the first port 21a to the second port 21b in accordance with a stroke movement of the valve-seat contact member 41 and supply the chemical liquid to the reaction chamber.

When supply of the chemical liquid to the wafer is to be stopped, the fluid control valve 1 is operated to discharge the operation fluid from the operation port 33b. Then, the piston 35 is urged by the first compression spring 36 to move toward the valve seat, thereby pressing the recessed portion 413 of the diaphragm valve element 4 toward the valve seat. Accordingly, the diaphragm valve element 4 is integrally moved downward with the piston 35 to bring the annular sealing surface 414 into contact with the valve seat surface 24a. Subsequently, the sealing load is applied to the annular sealing surface 414 to press-contact against the valve seat surface 24a. Thus, the fluid control valve 1 enters the standby state.

As explained in detail above, the present embodiment provides the fluid control valve 1 including the valve body 21 provided with the valve seat 24, the diaphragm valve element 4 provided with the valve-seat contact member 41 being in or out of contact with the valve seat 24 and the diaphragm member 42, and the drive section 3 to move the diaphragm valve element 4 in an axial direction. The diaphragm member 42 made of the first fluorine resin material includes the web portion 422 and the bar-like portion 423 in the center of the web portion 422. The valve-seat contact member 41 made of the second fluorine resin material, which is formed by injection-molding, includes the annular sealing surface 414 and the recessed portion 413 on a side opposite to the annular sealing surface 414. A part of the bar-like portion 423 is fitted in the recessed portion 413. A part of the outer circumference of the bar-like portion 423 is formed with the annular recess 424 constituting the outer circumferential uneven surface. The inner circumference of the recessed portion 413 is formed with the small-diameter recess 418 constituting the inner circumferential uneven surface. The annular recess 424 and the small-diameter recess 418 are closely contacted each other to form the engagement surface. These features contribute to creating no clearance between the recessed portion 413 and the bar-like portion 423, thus achieving prevention of residual of the chemical liquid and further preventing generation of particles caused by degradation of the residual chemical liquid.

Further, in the present embodiment, the first fluorine resin material is PTFE and the second fluorine resin material is PFA. Accordingly, the diaphragm member 42 having the softness and good flexibility and the valve-seat contact member 41 having hardness and good abrasion resistance are combined, thereby improving endurance. Further, generation of particles can be restrained.

Further, in the present embodiment, the drive section 3 includes the first compression spring 36 to urge the diaphragm valve element 4 in a direction to be in contact with the valve seat 24, the piston 35 to urge the diaphragm valve element 4 in a direction to separate from the valve seat 24 by the operation fluid, and the second compression spring 37 to urge the diaphragm valve element 4 in a direction to separate from the valve seat 24. The second compression spring 37 is configured to change its spring constant while the diaphragm valve element 4 is moved to be in contact. Accordingly, the collisional force generated in valve closing can be relaxed with maintaining the responsivity of the diaphragm valve element 4, and thus generation of the clearance between the bar-like portion 423 and the recessed portion 413 possibly caused by the collisional force can be prevented.

Further, the threaded orifice 46 provided in its axial center with the orifice 46a is placed in the second chamber 34b as a lower chamber port of the piston. Accordingly, the responsivity of the diaphragm valve element 4 is maintained and the collisional force generated in valve closing is relaxed, thereby preventing generation of the clearance possibly caused between the diaphragm member 42 and the valve-seat contact member 41 by the collisional force.

Figure 3:
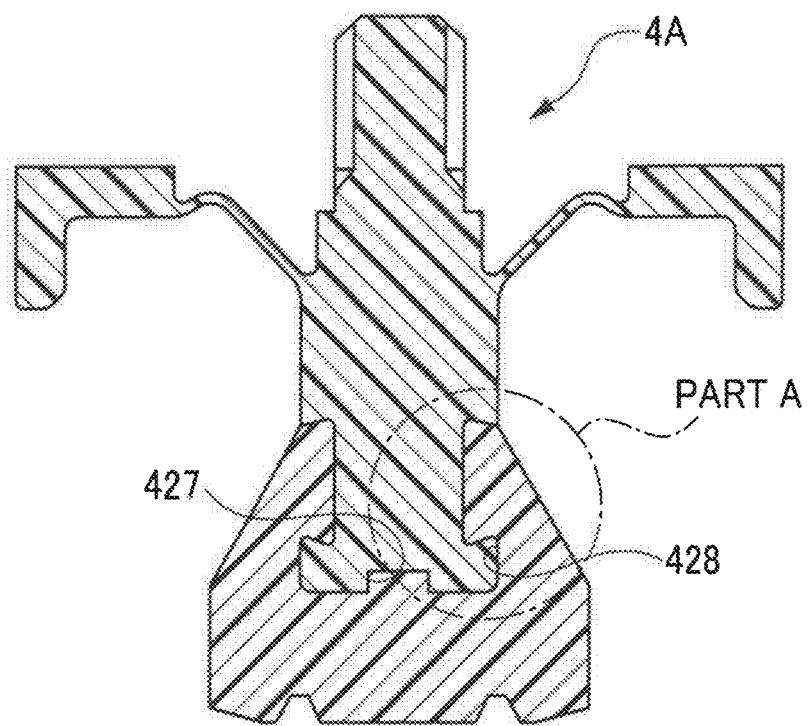
FIG. 3 is a sectional view of the diaphragm valve element in a second embodiment.
Figure 4:
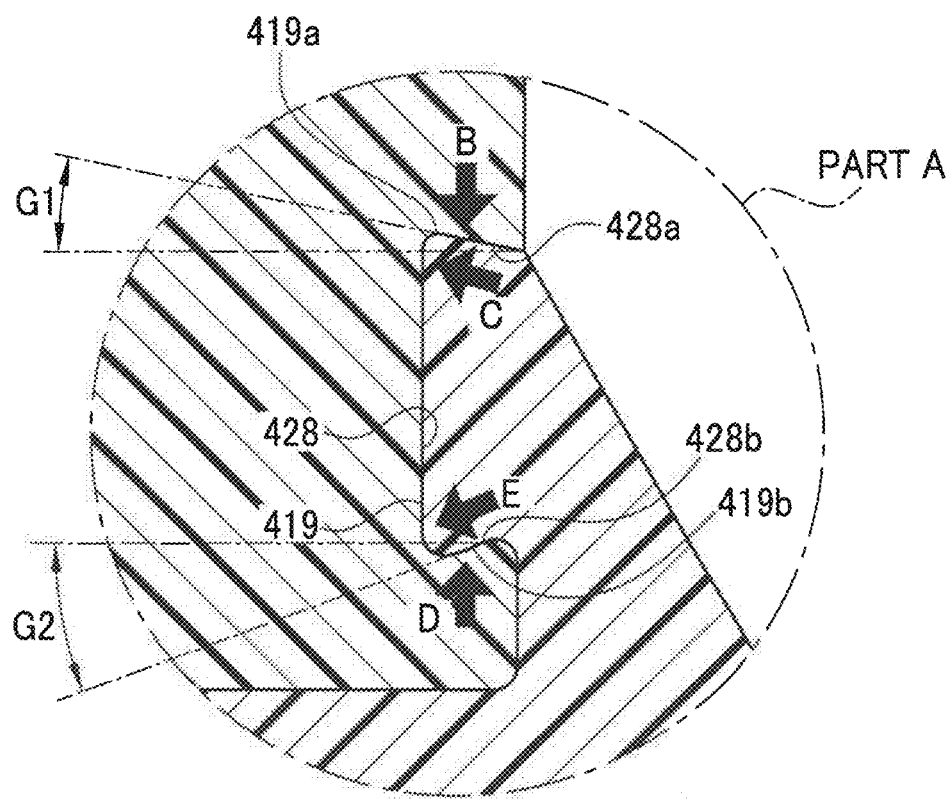
FIG. 4 is an enlarged view of a part A in FIG. 3.

FIG. 3 is a sectional view of a diaphragm valve element 4A of a second embodiment. FIG. 4 is an enlarged view of a part A in FIG. 3.

In the diaphragm valve element 4 in FIG. 2, when the annular sealing surface 414 is in contact with the valve seat surface 24a, an upper end face and a lower end face of the small-diameter recess 418 of the valve-seat contact member 41 are subjected to a force in a direction to be held and compressed by an inner circumferential upper surface and an inner circumferential lower surface of the annular recess 424 of the diaphragm member 42. By this force, the small-diameter recess 418 of the valve-seat contact member 41 could be disengaged from the annular recess 424 of the diaphragm member 42. Even if a slight clearance is generated by only a slight displacement, the chemical liquid could reside in the clearance and degradation of the residual chemical liquid may lead to generation of particles.

To address the above problem, in FIGS. 3 and 4, an upper end face 419a of a small-diameter recess 419 of the valve-seat contact member 41 and an inner circumferential upper surface 428a of an annular recess 428 of the diaphragm member 42 are each made to be slanted by an inclination angle G of 5 degrees with respect to a plane surface horizontal to an axis of the bar-like portion 423. The inclination angle G1 is set as 5 degrees in the present embodiment, but the angle G1 may be in a range of 5 degrees or more and 15 degrees or less.

When the annular sealing surface 414 is in contact with the valve seat surface 24a, the upper end face 419a of the small-diameter recess 419 is subjected to a pressing force indicated with an arrow B. On the other hand, another force indicated with an arrow C is applied to an upper part of the small-diameter recess 419 by an operation of a slanting surface, and thus the small-diameter recess 419 has no possibility of disengagement from the annular recess 428. When the inclination angle G1 is less than 5 degrees, the small-diameter recess 419 could be disengaged from the annular recess 428. Further, when the inclination angle G is more than 15 degrees, the outer circumferential uneven surface could be enlarged and abraded to generate particles.

A lower end face 419b of the small-diameter recess 419 of the valve-seat contact member 41 and the inner circumferential lower face 428b of the annular recess 428 of the diaphragm member 42 are each slanted with respect to a plane surface horizontal to the axis of the bar-like portion 423. In the present embodiment, the inclination angle G2 is set as about 10 degrees. The lower surface side is supported by a root part, and there is less possibility that the outer circumferential uneven surface is expanded to cause abrasion and particles compared to the upper surface side.

The lower end face 419b of the small-diameter recess 419 is therefore subjected to a pressing force indicated with an arrow D when the annular sealing surface 414 is in contact with the valve seat surface 24a. However, a force indicated with an arrow E is applied to the lower part of the small-diameter recess 419 by the operation of the slanting surface, and therefore the small-diameter recess 419 has no possibility of disengagement from the annular recess 428.

According to the second embodiment mentioned above, the annular recess 428 as the outer circumferential uneven surface and the small-diameter recess 419 as the inner circumferential uneven surface are both slanted by 5 to 15 degrees with respect to a horizontal plane surface in the radial direction. Accordingly, the upper end face 419*a* of the small-diameter recess 419 is subjected to the pressing force indicated with the arrow B while the annular sealing surface 414 is in contact with the valve seat surface 24*a*. However, an upper part of the small-diameter recess 419 is subjected to the force indicated with the arrow C owing to the slanting surface, and thus the small-diameter recess 419 has no possibility of disengagement from the annular recess 428.

The embodiments shown in FIGS. 2 and 3 have a possibility of deformation in the web portion 422 of the diaphragm element 42 due to heat generated in a process of forming the valve-seat contact member 41 after the diaphragm member 42 is inserted in a metal die. Further, the web portion 422 could be contaminated by adherence of oil or the like from a metal die surface.

Figure 5:
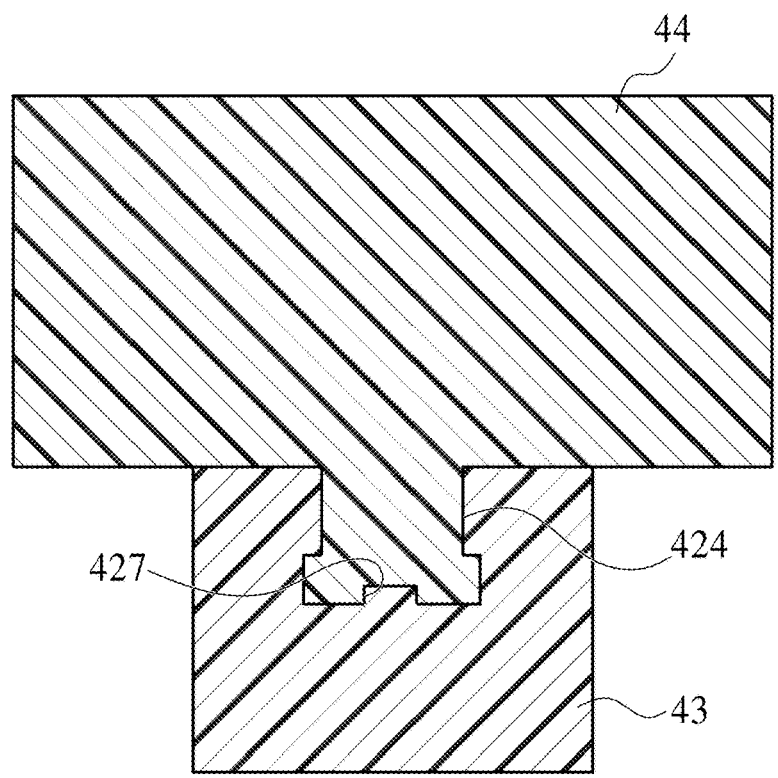
FIG. 5 is a view explaining a manufacturing method of the diaphragm valve element in a third embodiment.
Figure 5:
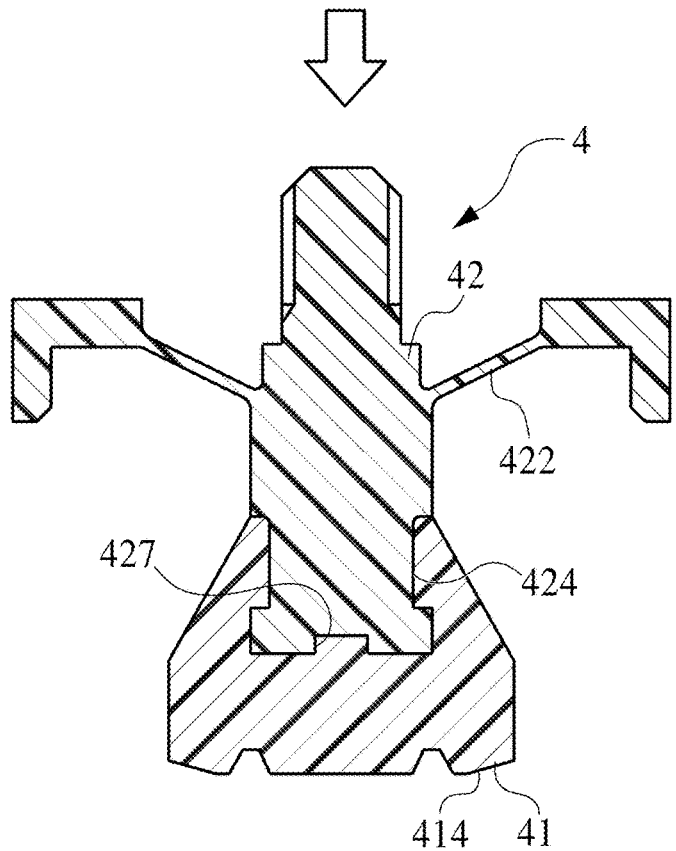

A third embodiment shown in FIG. 5 is presented to avoid deformation and contamination of the web portion 422 due to the heat of the metal die. A final product of the third embodiment shown in FIG. 5 is almost similar to that of the second embodiment except a manufacturing method.

Figure 6:
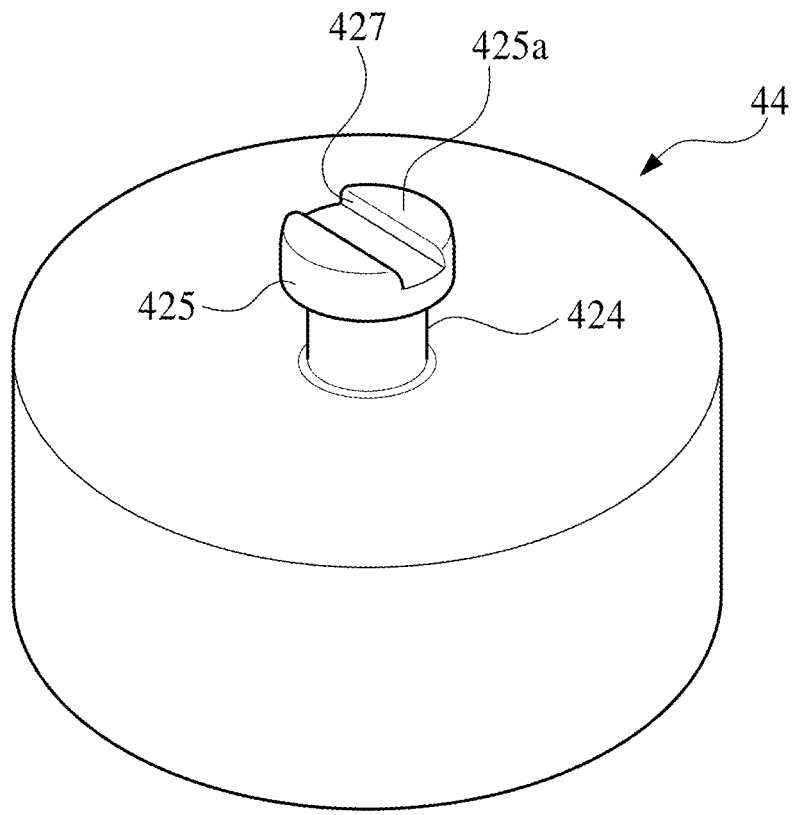
FIG. 6 is a perspective view of a first round bar formed with a step portion.

As shown in FIG. 5 (*a*), the diaphragm member 42 is formed of a PTFE-made first round bar 44 and the valve-seat contact member 41 is formed of a PFA-made second round bar 43. The first round bar 44 formed with the annular recess 424 is inserted in the metal die to mold the PFA-made second round bar 43. The thus formed round bars are shown in FIG. 5 (*a*). FIG. 6 is a perspective view of the first round bar 44 formed with a step portion. A bottom surface 425*a* of a lower-end outer circumference 425 is formed with a straight groove 427 (one example of a rotation restriction part). The straight groove 427 functions as a rotation restriction member to prevent the diaphragm member 42 and the valve-seat contact member 41 from being displaced each other in a rotation direction.

Subsequently, the first round bar 44 and the second round bar 43 are cut into shapes shown in FIG. 5 (*b*).

According to the third embodiment, the web portion 422 has no possibility of deformation due to heat of the metal die. Further, there is no possibility of contamination of the web portion 422 due to adherence of oil or the like on a metal die surface.

The third embodiment has the following features. Specifically, a part of the bar-like portion 423 is fitted in the recessed portion 413. The part of the bar-like portion 423 is formed on its outer circumference with the annular recess 424 as the outer circumferential uneven surface. The recessed portion 413 is formed on its inner circumference with the small-diameter recess 418 as the inner circumferential uneven surface. While the first round bar 44 is inserted, the second round bar 43 is injection-molded to cover the bar-like portion 423 as the part of the first round bar 44, and after this insert molding process, the first round bar 44 is cut into a shape of the diaphragm member 42 and the second round bar 43 is cut into a shape of the valve-seat contact member 41. Accordingly, no clearance is created between the recessed portion 413 and the bar-like portion 423, thus preventing residual of the chemical liquid and also preventing generation of particles due to degradation of the residual chemical liquid.

Further, in the third embodiment, the bar-like portion 423 and the recessed portion 413 are provided with the straight groove 427 to restrict their mutual rotation in the circumferential direction. Accordingly, there is no possibility of creating a clearance between the bar-like portion 423 and the recessed portion 413.

A fourth embodiment of the present disclosure is now explained with reference to FIGS. 9 and 10. The fourth embodiment is mostly similar to the second embodiment shown in FIG. 3, and thus only the different features are explained and the similar parts are omitted their explanation.

Figure 9:
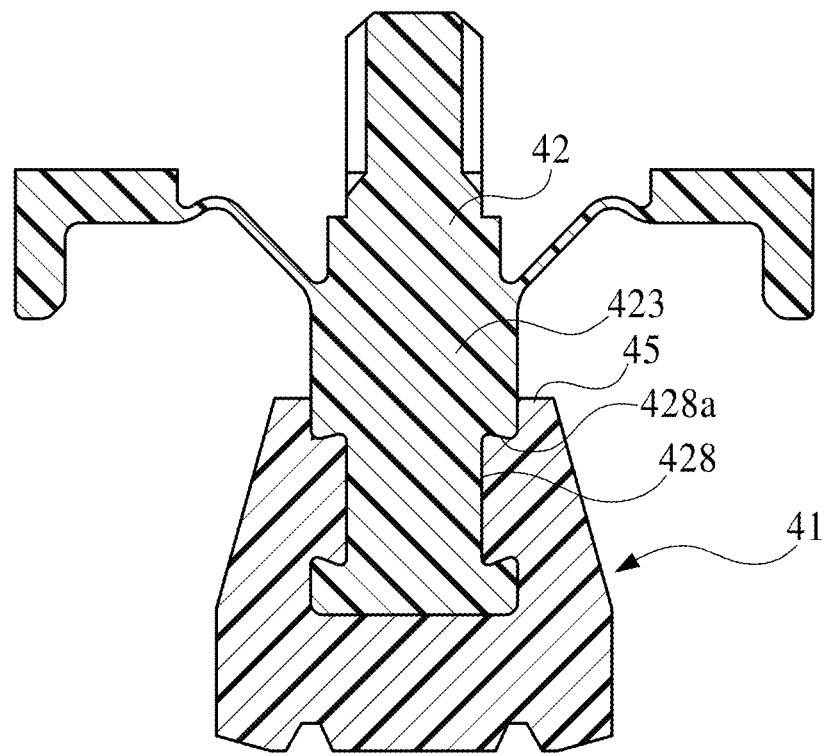
FIG. 9 is a sectional view of the diaphragm valve element in a fourth embodiment.
Figure 10:
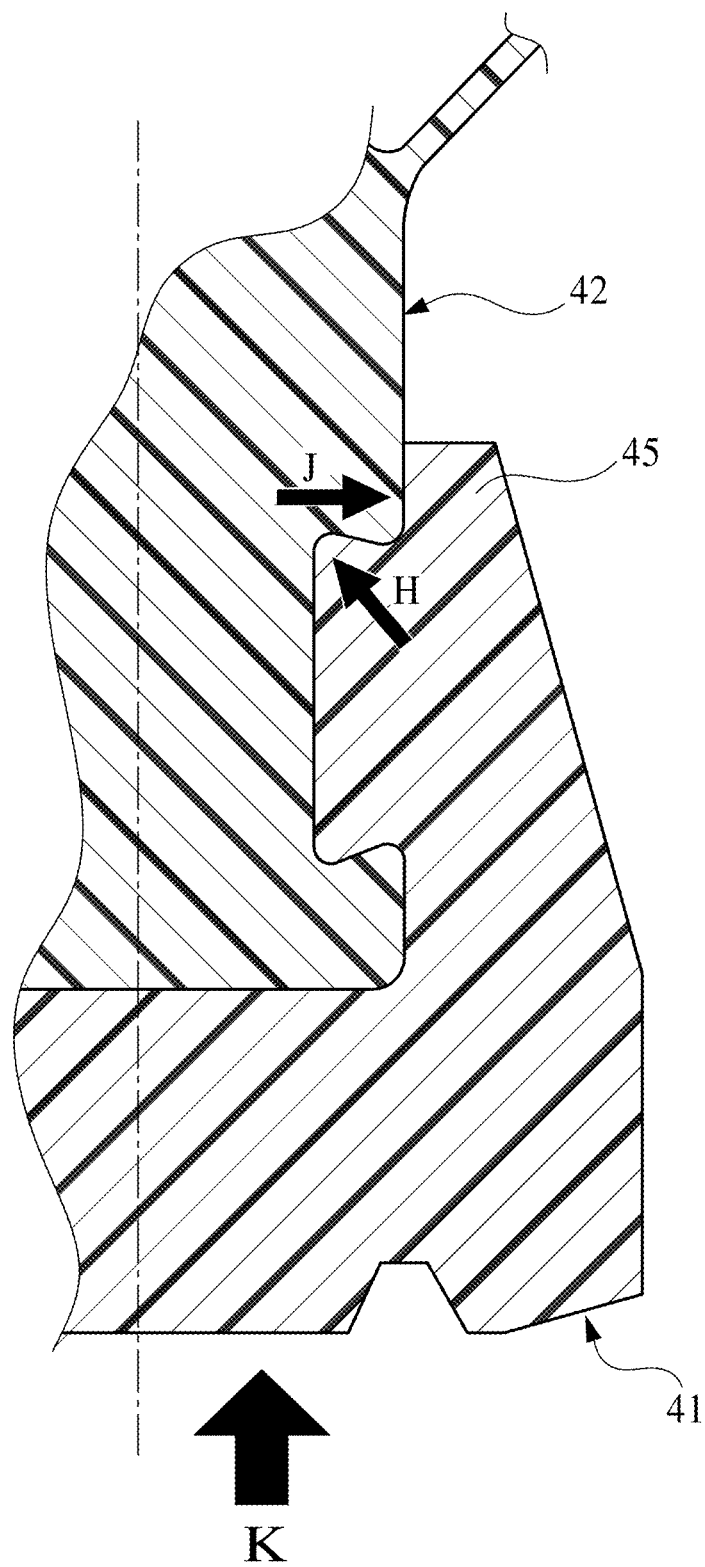
FIG. 10 is a partial enlarged view of FIG. 9.

As shown in FIG. 9, an upper part 45 of the valve-seat contact member 41 extends above an inner circumferential upper surface 428*a* of the annular recess 428 to an outer circumference of a large-diameter part of the bar-like portion 423.

According to the fourth embodiment, the recessed portion 413 is configured to extend over the annular recess 424 as the outer circumferential uneven surface of the bar-like portion 423 to the web portion 422. Accordingly, when the diaphragm valve element 4 is driven to bring the annular sealing surface 414 of the valve-seat contact member 41 into contact with the valve seat 24, a force indicated with an arrow H is exerted by a pressing force K as shown in FIG. 10. At this time, the diaphragm member 42 is made to be deformed in a direction indicated with an arrow J, but this deformation is restricted by the upper part 45 of the valve-seat contact member 41. The recessed portion 413 is thus configured to extend over the annular recess 424 of the bar-like portion 423 to the web portion 422 and the thus extended upper part 45 restricts any movement in the directions H and J. Accordingly, increase in the clearance and occurrence of abrasion are prevented.

A fifth embodiment of the present disclosure is explained with reference to FIG. 11. The fifth embodiment is mostly similar to the second embodiment shown in FIG. 3. Accordingly, only different features are explained and the similar features are omitted their explanation.

Figure 11:
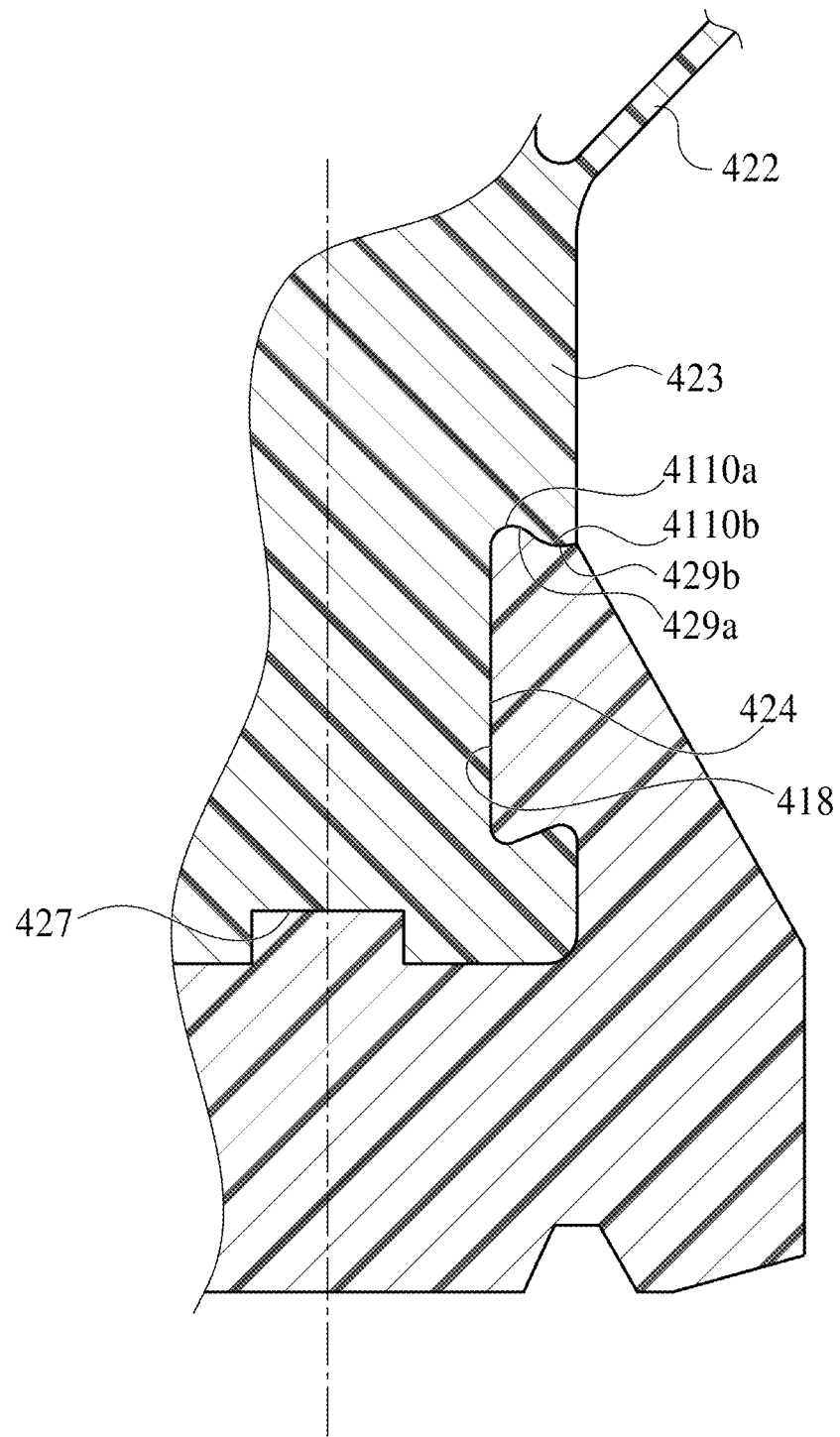
FIG. 11 is a sectional view of a part of the diaphragm valve element in a fifth embodiment.

As shown in FIG. 11, an upper surface of the annular recess 424 has a concave curved surface 429*a* and a convex curved surface 429*b*. The bar-like portion 423 has a convex curved surface 4110*a* in closely contact with the concave curved surface 429*a* and a concave curved surface 4110*b* in closely contact with the convex curved surface 429*b*.

Even if the valve-seat contact member 41 is repeatedly brought into contact with the valve seat 24 by the drive section 3 and repeatedly applied with the pressing force in its engagement part, there is no possibility of displacement in engagement surface since a connected part of the engagement surface of the concave curved surface 429*a* and the convex curved surface 4110*a* and the engagement surface of the convex curved surface 429*b* and the concave curved surface 4110*b* has a slanting curved face slanted away from the web portion 422 as approaching the outer circumference.

According to the fifth embodiment, the engagement surface is partly provided with a slanted surface slanting away from the web portion 422 as approaching the outer circumference. Accordingly, when the diaphragm valve element 4 is driven by the drive section 3 to repeatedly bring the valve-seat contact member 41 into contact with the valve seat 24 for a long period of time, the slanted surface extending away from the web portion 422 as approaching the outer circumference restrains dislocation of the recessed portion to outside even if the pressing force is applied to the engagement surface of the annular recess 424 and the small-diameter recess 418. Therefore, there is no clearance generated between the recessed portion and the bar-like portion.

The present disclosure is not limited to the above embodiments and may be modified in various manners.

For example, the separation spring (the second compression spring 37) is utilized in the present embodiments, but the present disclosure may be embodied without using the separation spring.

An outer peripheral boundary of the diaphragm member 42 and the valve-seat contact member 41 may be bonded by heat deposition with a heater or the like, ultrasonic deposition, laser deposition, and others so that occurrence of clearance and rotation are prevented.

In the present embodiment, the separation spring (the second compression spring 37) consisting of a dual pitch spring is used, but alternatively, a conical spring may be used.

In the present embodiment, a metal screw is used as the threaded orifice 46, but alternatively, a screw made of a porous resin body may be used. Application of the porous resin body can achieve prevention of corrosion and clogging in the orifice.

REFERENCE SIGNS LIST

1 Fluid control valve
3 Drive section
4 Diaphragm valve element (One example of valve element)
24 Valve seat
41 Valve-seat contact member
413 Recessed portion
414 Annular sealing surface
415 Annular recessed groove
418 Small-diameter recess (One example of inner circumferential uneven surface)
42 Diaphragm member
422 Web portion
423 Bar-like portion
424 Annular recess (One example of outer circumferential uneven surface)
425 Lower-end outer circumference

The invention claimed is:

1. A fluid control valve manufacturing method of manufacturing a fluid control valve comprising a valve main body provided with a valve seat, a valve element provided with a valve-seat contact member configured to be in and out of contact with the valve seat and a diaphragm member, and a drive section configured to move the valve element in its axial direction, wherein
  the diaphragm member made of a first fluorine resin material is provided with a web portion and a bar-like portion in a center of the web portion,
  the valve-seat contact member made of a second fluorine resin material, which is allowed to be insert-molded, is provided with a valve-seat contact surface and a recessed portion on a side opposite to the valve-seat contact surface,
  a part of the bar-like portion is fitted in the recessed portion,
  an uneven surface of the bar-like portion and an uneven surface of the recessed portion are in close contact with each other to form an engagement, and
  the method includes an insert molding step of inserting a first bar and injection-molding a second bar and a step of cutting the first bar into a shape of the diaphragm member and cutting the second bar into a shape of the valve-seat contact member.

2. The fluid control valve manufacturing method according to claim 1, wherein the first fluorine resin material is PTFE and the second fluorine resin material is PFA.

3. The fluid control valve manufacturing method according to claim 2, wherein the bar-like portion and the recessed portion are provided with a rotation restriction part.

4. The fluid control valve manufacturing method according to claim 3, wherein the recessed portion extends over an annular recess formed on an outer circumferential surface of the bar-like portion toward the web portion.

5. The fluid control valve manufacturing method according to claim 3, wherein the engagement partly has a slanting surface slanted away from the web portion as the slanting surface approaches an outer circumference of the engagement.

6. The fluid control valve manufacturing method according to claim 3, wherein the engagement partly has a slanting surface that is slanted by a degree range of 5 degrees or more and 15 degrees or less with respect to a horizontal plane in a radial direction.

* * * * *